United States Patent
Cheng et al.

(10) Patent No.: US 7,935,322 B2
(45) Date of Patent: May 3, 2011

(54) SOLVENT EXTRACTION PROCESS FOR SEPARATING COBALT AND/OR NICKEL FROM IMPURITIES IN LEACH SOLUTIONS

(75) Inventors: Chu Yong Cheng, South Lake (AU); Mark Daniel Urbani, Wattle Grove (AU)

(73) Assignee: Commonwealth Scientific & Indistrial Research Organisation, Campbell ACT (AU)

( * ) Notice: Subject to any disclaimer, the term of this patent is extended or adjusted under 35 U.S.C. 154(b) by 6 days.

(21) Appl. No.: 10/588,116

(22) PCT Filed: Jan. 28, 2005

(86) PCT No.: PCT/AU2005/000099
§ 371 (c)(1),
(2), (4) Date: Jun. 19, 2007

(87) PCT Pub. No.: WO2005/073416
PCT Pub. Date: Aug. 11, 2005

(65) Prior Publication Data
US 2007/0248514 A1    Oct. 25, 2007

(30) Foreign Application Priority Data

Jan. 28, 2004 (AU) ............................... 2004900457
Jul. 27, 2004 (AU) ............................... 2004904166
Oct. 29, 2004 (AU) ............................... 2004906241

(51) Int. Cl.
*B01D 11/00* (2006.01)

(52) U.S. Cl. ...................... 423/139; 423/138; 423/150.1

(58) Field of Classification Search .................. 423/138, 423/139, 150.1
See application file for complete search history.

(56) References Cited

U.S. PATENT DOCUMENTS

| | | | |
|---|---|---|---|
| 3,276,863 A | 10/1966 | Drobnick et al. | |
| 3,903,235 A | 9/1975 | Cardwell et al. | |
| 4,104,359 A * | 8/1978 | Davis et al. | 423/139 |
| 4,120,817 A * | 10/1978 | Hummelstedt et al. | 252/364 |
| 4,193,969 A | 3/1980 | Fekete et al. | |
| 5,447,552 A * | 9/1995 | Mihaylov et al. | 75/722 |

FOREIGN PATENT DOCUMENTS

| | | |
|---|---|---|
| CA | 1 223 242 | 6/1987 |
| EP | 0 851 035 | 7/1998 |
| GB | 1 504 216 | 3/1978 |
| GB | 2 109 357 A | 6/1983 |
| WO | 98/14623 | 4/1998 |

(Continued)

OTHER PUBLICATIONS

Derwent Abstract Accession No. 84-109393/18, Class E31, J01, M25, ES 8401143 A, (Schortmann P C), Feb. 16, 1984, Abstract.
Fleet et al. "Extraction of Metal Ions by LIX 63/carboxylic acid mixtures." *Solvent Extraction*. vol. 1. 1971. pp. 214-223.

(Continued)

*Primary Examiner* — Melvin C Mayes
*Assistant Examiner* — Melissa Stalder
(74) *Attorney, Agent, or Firm* — Merchant & Gould P.C.

(57) ABSTRACT

A process for the separation of nickel, cobalt or both from impurity elements selected from one or more of calcium, magnesium, manganese and chloride contained in a leach solution, the process comprising the step of subjecting the leach solution to solvent extraction using a carboxylic acid (such as Versatic 10), a hydroxyoxime such as LIX 63, a kinetic accelerator such as TBP, and optionally a stabilizer.

35 Claims, 9 Drawing Sheets

FOREIGN PATENT DOCUMENTS

WO 02/22896 A1 3/2002

OTHER PUBLICATIONS

Chu Yong Cheng, 2006, "Solvent Extraction of nickel and cobalt with synergistic systems consisting of carboxylic acid and aliphatic hydroxyoxime", Hydrometallurgy, 84:109-117.

Flett, D.S., Cox, M., Heels, J.D., 1974, Extraction of Nickel by α hydroxy oxime/lauric acid mixtures. Proceedings of ISEC '74, vol. 3. Society of Chemical Industry, London, pp. 2560-2575.

MEAB, Solvent Extraction Principles, http://www.meab-mx.se/en/sx_principles.htm, p. 1-2 printed on Aug. 31, 2010 (according to http://www.archive.org, this article was uploaded onto the internet at least as early as Dec. 4, 2003).

MEAB, Solvent Extraction Research, http://www.meab-mx.se/en/sx_research.htm, p. 1-2 printed on Aug. 31, 2010 (according to http://www.archive.org, this article was uploaded onto the internet at least as early as Dec. 12, 2003).

* cited by examiner

SOLVENT EXTRACTION PROCESS FOR SEPARATING COBALT AND/OR NICKEL FROM IMPURITIES IN LEACH SOLUTIONS

The present invention relates to a process for separating cobalt and/or nickel from other elements contained in an aqueous solution such as an aqueous leach solution, and for recovering the cobalt and/or nickel where desired.

The world mineral industry is experiencing an unprecedented interest in nickel-cobalt extraction from laterite ores through pressure acid leach (PAL) and solvent extraction-electrowinning (SX-EW) processes. In Western Australia, three nickel laterite plants are in operation. These are the Cawse, Bulong and Murrin Murrin nickel plants. In New Caledonia, the Goro process has been tested in a large pilot plant. The PAL process for these projects is very similar, however the down stream processes (especially SX) differ substantially.

In the Murrin Murrin process, a sulphide precipitation is used to separate the nickel, cobalt, copper and zinc from impurities such as calcium, magnesium and manganese, which remain in the leach solution. After solids/liquid separation, the nickel, cobalt, copper and zinc are re-leached under pressure with acid. Further solution purification is needed to separate nickel and cobalt from copper and zinc. The cobalt is then separated from nickel by solvent extraction with Cyanex 272. The nickel and cobalt are recovered by reduction with hydrogen. The drawbacks of the Murrin Murrin process are:

The separation of manganese from cobalt by sulphide precipitation is incomplete and causes problems in the downstream processes, The leaching of sulphides needs high pressure and high temperature, indicating high capital and operating costs.

The separation of other impurities such as copper and zinc from nickel and cobalt needs separate processes.

In the Cawse process, a hydroxide precipitation is used to separate the impurities such as calcium, magnesium and manganese (partly). After solids/liquid separation, the nickel, cobalt, copper, zinc and some manganese are re-leached with an anmoniacal solution. Nickel and copper are separated from cobalt and zinc by solvent extraction with LIX84I. Further solution purification is needed to separate nickel from copper and cobalt from zinc. The nickel is recovered by electrowinning while cobalt is precipitated as sulphide. The drawbacks of the Cawse process are:

The use of magnesia as precipitation agent adds cost to operation,

The use of ammoniacal leaching to separate manganese from nickel and cobalt results in complexity of the flowsheet and causes serious problems in the downstream processes, The reductive stripping of cobalt from organic extractant and the re-oximation of the organic extractant cause organic degradation, which in turn results in crud formation, Ammonia is expensive and the scrubbing and recovery of ammonia are difficult, Cobalt product containing zinc is a semi-product, indicating revenue loss.

The Bulong process uses a direct solvent extraction approach. Cobalt, copper, zinc and manganese are separated from nickel, calcium and magnesium by solvent extraction with Cyanex 272. The nickel in the raffinate is separated from calcium and magnesium by solvent extraction with Versatic 10 and then electrowon. The solution containing cobalt, copper, zinc and manganese is subjected to sulphide precipitation, solids/liquid separation and acid pressure re-leach to separate cobalt, copper and zinc from manganese. The copper is eliminated from the solution by ion exchange and zinc by solvent extraction with D2EHPA. The cobalt is then recovered from the purified solution by electrowinning. The drawbacks of the Bulong process are:

Manganese is separated from cobalt by sulphide precipitation and other impurities are separated by different further processes (ion exchange and further SX), Gypsum precipitation occurs in both Cyanex 272 and Versatic 10 circuits, Other processes have been developed to varying extents for the direct solvent extraction of nickel and cobalt, including the Goro process. Such processes suffer from varying disadvantages, including:

the need to remove copper from the leach solution before it enters the extraction circuit, thus requiring a large volume of the leach solution to pass through two circuits, the requirement for high acidity (6M HCl), high temperature (60° C.) and longer than usual stripping time (5 minutes) to strip the nickel, cobalt and zinc from the loaded organic solution, high cost in recovering and recycling the expensive HCl and further difficulties associated with corrosiveness of the acid, and the need to regenerate the organic extractant due to degradation of the extractant in the process.

Other processes can suffer from difficulties in phase separation and lack of availability of extractants or other agents required for the process.

It is an object of the invention to provide an alternative process for separating nickel and/or cobalt from other elements that avoids some of the disadvantages of the existing methods.

SUMMARY OF THE INVENTION

The present invention broadly provides a process for the separation of nickel, cobalt or both from impurity elements contained in a leach solution, the process comprising the step of subjecting the leach solution to solvent extraction using a carboxylic acid, a hydroxyoxime and a kinetic accelerator.

The solvent extraction step described above achieves very good separation of (copper, zinc,) nickel and cobalt present in the leach solution from calcium, magnesium, manganese and chloride impurity elements which may be present. The kinetic accelerator, such as tributyl phosphate (TBP), enhances the stripping and extraction kinetics and thus makes the process particularly commercially viable.

The solvent extraction step comprises contacting the leach solution with an organic solution comprising the carboxylic acid, hydroxyoxime and kinetic accelerator. It has also been found that a stabilizer (for the hydroxyoxime) enhances the stability of the organic system. Therefore, according to a preferred embodiment the organic solution further comprises a stabilizer.

According to another preferred embodiment, the nickel, cobalt or both extracted into the organic phase during the solvent extraction are recovered from the organic phase. As explained in the detailed description below, if both cobalt and nickel are present in the organic phase in the appreciable quantities, they are separated from each other and recovered separately in the subsequent treatment stages.

According to one embodiment, the recovery step comprises selective stripping of the organic phase to separate the cobalt from the nickel. The cobalt may thereafter be recovered from the loaded aqueous strip liquor, and the nickel recovered from the selectively stripped organic solution by bulk stripping.

BRIEF DESCRIPTION OF THE DRAWINGS

The invention will be described in further detail with reference to the following figures which relate to embodiments of the invention.

DETAILED DESCRIPTION OF THE INVENTION

Figure 1:
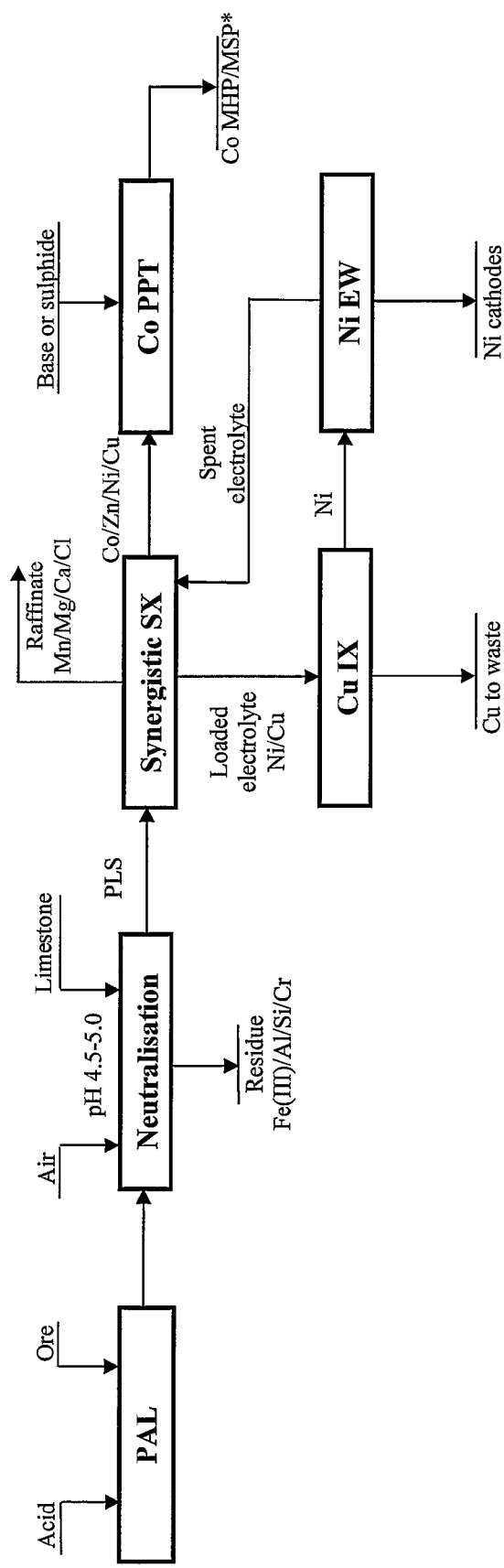
FIG. 1 is a schematic flow chart of the steps of the process of one embodiment of the invention.

At the core of the present invention is a synergistic solvent extraction step which effects extraction of a large proportion of the nickel, cobalt, copper and zinc into an organic phase (to the extent that these elements are present), with a large proportion of the calcium, magnesium, manganese and chloride being rejected to the aqueous phase. The solvent extraction is conducted by contacting the leach solution with an organic solution comprising a combination of carboxylic acid, a hydroxyoxime synergist, and a kinetic accelerator. Preferably, the organic solution also comprises a stabilizer.

In the context of the present invention, what constitutes a "large" proportion can be determined by a person skilled in the art by reference to whether or not the level of separation is sufficient for a commercially viable process. A "large" proportion may be around 80% or more, and typically even higher, although the level will vary from element to element, and will depend on the chosen process steps for the complete procedure for recovery of selected elements.

To avoid any doubt, the singular forms "a", "an" and "the" include the corresponding plural reference unless the context clearly indicates otherwise. Thus, for example, "a hydroxyoxime synergist" includes one or more hydroxyoxime synergists.

The hydroxyoxime synergist is capable of increasing the pH gap, $\Delta pH_{50}$, between isotherms for nickel and cobalt and those for manganese, calcium and magnesium. This results in advantageous selectivity of nickel and cobalt over the impurities manganese, calcium, magnesium and chloride.

The $pH_{50}$ value is the pH at which 50% metal extraction is achieved. Thus, $\Delta pH_{50}$ is the difference between the $pH_{50}$ values for two metals, or the difference between the $pH_{50}$ values for the same metal under different conditions.

Carboxylic Acid

In the most preferred embodiment of the invention, the carboxylic acid is 2-methyl, 2-ethyl heptanoic acid (commercially available as Versatic 10) or a cationic exchange extractant having extraction characteristics similar to 2-methyl, 2-ethyl heptanoic acid. Cationic exchange extractants have hydrogen ions which are exchanged with metal ions in the aqueous solution. The term carboxylic acid is used in its broadest sense to refer to any organic carboxylic acid. Carboxylic acids have the formula RCOOH, in which R represents any optionally substituted aliphatic or aromatic group, or combinations of these groups, including optionally substituted alkyl, alkenyl, alkynyl, aryl, or heteroaryl groups (and combinations thereof). Preferably R represents a relatively bulky group containing at least 4 carbon atoms, and preferably between 4 to 18 carbon atoms.

The term "alkyl" used either alone or in a compound word such as "optionally substituted alkyl" or "optionally substituted cycloalkyl" denotes straight chain branched or mono- or poly-cyclic alkyl, preferably C1-30 alkyl or cycloalkyl, most preferably C4-18 alkyl. Examples of straight chain and branched alkyl include methyl, ethyl, butyl, isobutyl, tert-butyl, 1,2-dimethylpropyl, 1-methylpentyl, 5-methylhexyl, 4,4-dimethylpentyl 1,2-dimethylpentyl, 1,3-dimethylpentyl, 1,1,2-trimethylbutyl, nonyl, 1- 2- or 3-propylhexyl, decyl, 1-, 2-, 3-, 4-, 5- or 6-ethyloctyl, 1-, 2-, 3-, 4- or 5-propyloctyl, 1-, 2- or 3-butylheptyl, 2-hexyl 2-methyloctyl and the like. Examples of cyclic alkyl include cyclohexyl, cycloheptyl, cyclooctyl, cyclononyl and cyclodecyl and the like. The alkyl may optionally be substituted by any non-deleterious substituent.

In this specification "optionally substituted" means that a group may or may not be further substituted with one or more groups selected from alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, haloaryloxy, nitro, nitroalkyl, nitroalkenyl, nitroalkynyl, nitroaryl, nitroheterocyclyl, amino, alkylamino, dialkylamino, alkenylamino, alkynylamino, arylamino, diarylamino, benzylamino, dibenzylamino, acyl, alkenylacyl, alkynylacyl, arylacyl, acylamino, diacylamino, acyloxy, alkylsulphonyloxy, arylsulphenyloxy, heterocyclyl, heterocycloxy, heterocyclamino, haloheterocyclyl, alkylsulphenyl, arylsulphenyl, carboalkoxy, carboaryloxy, mercapto, alkylthiom benzylthio, acylthio and the like.

Suitable optional substituents will be chosen on the basis that the carboxylic acid have the desired extraction characteristics, and the substituents do not react with any other component of the mixture under the given extraction conditions.

Hydroxyoxime

A hydroxyoxime is used as a synergist with the carboxylic acid in the solvent extraction step. A hydroxyoxime is a compound containing an oxime group and a hydroxy group. Preferably, the groups are in an α-position with respect to each other. Such α-hydroxyoximes are chelating, whereas oximes are generally non-chelating. The "oxime" functional group contains a carbon to nitrogen double bond, with the nitrogen atom being attached to an oxygen atom. Accordingly, the term oxime includes within its scope oximes with a hydroxy group attached to the nitrogen atom, and oxime ethers, although hydroxime (>C=N—OH) is preferred. The hydroxyoxime may be a C6-C26 hydroxyoxime. Preferably, the hydroxyoxime is an aliphatic hydroxyoxime. Preferably, the hydroxyoxime is of the formula:

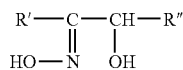

in which R' and R" are each selected from an optionally substituted, straight chain, branched or cyclic alkyl, group containing from 2 to 12 carbon atoms. Preferably each of R' and R" are unsubstituted alkyl groups, most preferably a heptyl group. An example of such a compound is 5,8-diethyl-7-hydroxy-6-dodecanone oxime (the active component of a commercial agent LIX 63). This has the following structure:

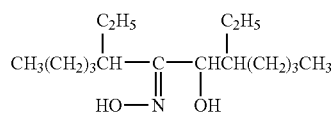

Kinetic Accelerator

A kinetic accelerator is an agent that improves the extraction and/or stripping kinetics of metals. Suitable kinetic accelerators are those that improve the extraction and/or stripping kinetics of nickel. Examples of kinetic accelerators are tri n-butyl phosphate (TBP), 2-ethylhexanol, isodecanol, isotridecanol and nonyl phenol. Any reagent that performs the function of increasing the rate of extraction and stripping (preferably of nickel) may be used as the kinetic accelerator. TBP is the preferred kinetic accelerator.

Stabilizer

Under some conditions, the reagent mixture of carboxylic acid and hydroxyoxime may be susceptible to degradation, particularly with respect to the hydroxyoxime component. Accordingly, a suitable stabilizer may advantageously be used to slow any degradation reaction. Degradation may take place via a number of mechanisms, including oxidation and hydrolysis. Hence the stabilizer is suitably one that mitigates against oxidation and/or hydrolysis of the hydroxyoxime. Such stabilizers include, but are not limited to, esters (e.g. TXIB), ethers, ketones, alcohols (e.g. isodecanol, TDA) and alkylphenols (e.g. nonylphenol, dodecylphenol, BHT, Ionol). Preferably the stabilizer is an anti-oxidant. Of these, we have found the alkylphenol anti-oxidants to be particular useful. The term "alkylphenol" encompasses all alkyl derivatives of phenol, and in particular those derivatives with one or more straight chain, branched or cyclic alkyl substituents.

The alkylphenol 2,6-bis(1,1-dimethylethyl)-4-methyl phenol (commercially available as BHT and Ionol) or reagents with similar anti-oxidant characteristics to 2,6-bis(1,1-dimethylethyl)-4-methyl phenol are particularly useful.

Leach Solution

The leach solution subjected to the synergistic solvent extraction with carboxylic acid, hydroxyoxime kinetic acceleration and, optionally, a stabilizer may be any type of leach solution containing nickel and/or cobalt, together with impurity elements selected from one or more of calcium, magnesium, manganese and chloride, optionally together with copper and zinc. The leach solution may for instance be a pregnant leach solution obtained from the pressure acid leaching of any suitable ore type, such as a laterite or sulphide ore. It may alternatively be a solution from bio-leach, atmospheric acid leach, oxidative leach, reductive leach or chloride leach processes. The steps involved in producing such leach solutions are well known in the art.

The leach solution is preferably a solution that has been subjected to a preliminary iron precipitation step to precipitate out iron and aluminum to leave an aqueous leach solution containing the target elements and impurity elements identified above.

Synergistic Solvent Extraction Conditions

The solvent extraction step involves contacting an organic solvent containing the carboxylic acid, hydroxyoxime, kinetic accelerator and optionally stabilizer with the (aqueous) leach solution. The organic solvent may be any suitable organic solvent known in the art. Kerosene is the most common solvent/diluent used for this purpose due to its low cost and availability. Shellsol 2046 is one specific example.

The amount of carboxylic acid and hydroxyoxime (and other components) in the organic solution used in the solvent extraction step will depend on the concentration of the nickel, cobalt or both to be extracted and the A/O (aqueous/organic) flow rate ratio. The concentration would typically be in the range of from 0.1 to 2.0 M for carboxylic acid, with a preferred range of 0.1 to 1.0M, and 0.05 to 1.0 M for hydroxyoxime. The range of kinetic accelerator will typically be in the range of 0.1 to 5 M, with a preferred range of 0.1 to 1.0 M. The amount of stabilizer may be in the range of from 0 to 0.1 M, typically 0.005 to 0.1 M.

Preferably, the pH of the aqueous phase is maintained in a range from 5.0 to 6.5 and more preferably 5.5 to 6.0 in the extraction step. The temperature is preferably maintained in the range of from 10° C. to 60° C., more preferably from 20 to 40° C. Whilst temperatures as low as 10° C. are achievable, a temperature lower than 15° C. results in high viscosity. At temperatures higher than 60° C. there is a risk of evaporation and degradation of the organic phase.

The aqueous to organic ratio (A/O) in the extraction step is most preferably 1:1, but may lie in the range from 10:1 to 1:10, and preferably 1:5 to 5:1. The aqueous to organic ratio maintained in the scrubbing step may lie within the range of from 1:5 to 1:200, but preferably it is in the range of 1:5 to 1:20.

The nickel and/or cobalt extracted into the loaded organic phase in the synergistic solvent extraction is recovered in downstream processing stages.

Scrubbing

The organic phase from the synergistic extraction step of the invention is suitably subjected to scrubbing. The scrub solution may suitably be a process stream recycled from the process, and is preferably derived from an aqueous stream of a stripping stage (which may be a selective stripping stage) following the scrubbing stage. The scrub solution suitably contains cobalt and zinc sulphate, optionally with some nickel and copper.

Recovery of Nickel, Cobalt or Both from Scrubbed Organic Solution

There are a number of options envisaged for the recovery of nickel, cobalt or both from the scrubbed organic solution. Two options having particular advantages in combination with the synergistic solvent extraction stage of the invention are described below. Nevertheless, it is noted that other options within the skill and knowledge of those in the art could be used in place of the following, and are within the scope of the present invention.

Option 1: Selective Stripping

According to one embodiment, the organic phase is subjected to selective stripping to separate to a significant extent the nickel and the cobalt. The selective strip suitably involves contacting the organic phase from the synergistic extraction with an acidic aqueous solution to yield (a) a loaded strip liquor containing cobalt (and zinc, if this was present in the organic phase from the synergistic extraction), and only a small amount of nickel (and possibly copper), and (b) a selectively stripped organic solution containing nickel (and copper, if this was present in the organic phase from the synergistic extraction) and only a small amount of cobalt (and possibly zinc).

The acidic aqueous solution for the selective strip is suitably sulphuric acid solution, although other aqueous acid solutions known in the art (such as hydrochloric) may be used. The pH of the acidic aqueous solution is suitably in the range of about 3.0 to 4.0, depending on the level of separation desired. Most preferably, the pH is about 3.5.

The combination of the described synergistic extraction with the selective strip of cobalt from nickel is a very useful combination, enabling the recovery of nickel and cobalt using only one solvent extraction circuit (although more than one circuit could be used if so desired with other process steps). Thus, according to one embodiment of the invention, the process comprises a single solvent extraction circuit.

Recovery of Nickel, Cobalt or Both Following Selective Stripping

Various options are envisaged for the recovery of nickel, cobalt or both following the selective stripping.

Cobalt

The loaded strip liquor containing cobalt (and possibly zinc) may be subjected to cobalt precipitation using a base or sulphide. The product of this step is a mixed hydroxide product (MHP) or mixed sulphide product (MSP). Cobalt precipitation is a known and commercially used process step in the minerals industry, and therefore the details of this step require no further discussion here.

Alternatively, the loaded strip liquor may be recovered as pure cobalt products, optionally preceded by copper/zinc and/or nickel ion exchange.

Nickel

The stripped organic solution from the selective stripping step contains nickel (and possibly copper). If copper is present, nickel is separated from the copper using any suitable process known in the art. The following is a description of one preferred series of steps for recovering the nickel.

The organic solution from the selective stripping step (which is optionally scrubbed) is subjected to stripping with an aqueous acid solution of a suitable pH to separate the nickel into the aqueous phase with only a small amount of the copper. This loaded strip liquor may then be subjected to ion exchange to remove copper, with the nickel reporting to the eluate. The eluate containing nickel with minimal impurities may then be recovered by any suitable process such as electrowinning. Details of the ion exchange and electrowinning stages are well known in the art of the invention.

Process streams from the above stages are suitably recycled to minimise loss of valuable elements and maximise process efficiency. The optional scrubbing of the organic solution from the selective stripping stage suitably involves the use of the nickel (and copper) containing aqueous solution (eg sulphate solution) from the subsequent stripping stage. The stripping of nickel from the organic solution may be conducted with the nickel spent electrolyte from the nickel electrowinning step, which contains acid (typically sulphuric acid) and a relatively low concentration of nickel. Then the stripped organic solution containing small amounts of nickel (and copper) from this second stage of stripping may be recycled to the extraction stage to minimise loss of nickel. Finally, the nickel spent electrolyte can be recycled to the nickel stripping stage.

Recovery of nickel and cobalt from purified leach solutions by electrowinning, precipitation or any other appropriate process, is best performed after the metals have been concentrated to an appropriate level (often of the order of 60 g/L). The process described above is suitable for concentrating the nickel and cobalt to these levels. This compares with the typical concentrations in originating leach solutions, such as a laterite leach solution, of around 1.0-4.0 g/L nickel and 0.1-0.4 g/L cobalt.

Option 2: Second SX Circuit with Organophosphinic Acid

After scrubbing, the scrubbed organic solution can be completely stripped to obtain (a) a loaded strip liquor containing nickel and cobalt (and copper and zinc impurities), and (b) a stripped organic solution.

The loaded strip liquor thus obtained can be subjected to organophosphinic acid solvent extraction, using a suitable organophosphinic acid such as Cyanex 272. This extraction stage, and the identity of organophosphinic acids, are as described in co-pending application PCT/AU01/01161, the full disclosure of which is incorporated herein by reference.

In the case of the use of Cyanex 272, the loaded organic solution from the Cyanex extraction step contains cobalt (and zinc and copper, to the extent they are present) and only a small amount of nickel. The loaded Cyanex organic solution is scrubbed, and the scrubbed organic solution containing cobalt (copper and zinc) is subjected to stripping with sulphuric acid at an appropriate pH. The loaded strip liquor containing cobalt (copper and zinc) is subjected to ion exchange to remove copper and zinc present. The eluate containing only cobalt can then be subjected to electrowinning, hydrogen reduction or precipitation, as desired, to recover the cobalt.

The aqueous raffinate from the Cyanex extraction stage containing nickel may be subjected to electrowinning, hydrogen reduction or precipitation to recover the nickel therefrom.

Details of preferred features regarding this option, and particularly the recycling of process streams, will be explained below with reference to the figures.

Other Process Details

The synergistic extraction step of the present invention may be combined with different preliminary and following process steps for the development of processes suitable for the recovery of (copper, zinc,) cobalt and/or nickel when different impurity elements may be present.

It will be well understood to persons skilled in the art of the invention that scrubbing stages of the type well known in the art may be used for recovering elements even if the scrubbing stages are not specifically mentioned. The design of the optimum arrangement of scrubbing stages will depend on the specific aqueous leach solution and the elements desired to be recovered therefrom (and target percentage recovery levels).

It is also an advantage of the present invention that (copper, zinc,) cobalt and/or nickel can be separated from impurities contained in leach solutions without intermediate precipitation of the cobalt and/or nickel with other impurity elements and re-leaching of the precipitate to subsequently enable the removal of the impurities. Thus, in a preferred embodiment of the invention, the process does not include a precipitation step involving precipitation out of the target elements and re-leaching of the precipitate.

EXAMPLES

The present invention will now be described in further detail with reference to the following examples and process flowcharts which demonstrate the underlying theory behind the invention, and how the invention is put into practice.

Batch Test Work

Example 1

Extraction pH Isotherms of Metals with Versatic 10/LIX63 Synergistic System

This example illustrates that when Versatic 10 is used as the extractant with no added synergist, the pH isotherms of the "valuable" elements Zn, Ni, and Co are too close to the isotherms of the "impurity" elements Mn, Ca and Mg for effective separation. However when a synergistic system comprising Versatic 10 and LIX 63 is used, the isotherms of the "valuable" elements Cu, Zn, Ni, and Co are sufficiently separated from the isotherms of Mn to allow effective separation. Further, the isotherm of Mn is sufficiently separated from the isotherms of Ca and Mg to allow effective separation.

The aqueous solution was a synthetic solution to simulate a typical laterite leach solution containing 3 g/L Ni, 0.3 g/L Co, 0.2 g/L Cu and Zn, 2 g/L Mn, 10 g/L Mg and 0.5 g/L Ca.

Figure 4:
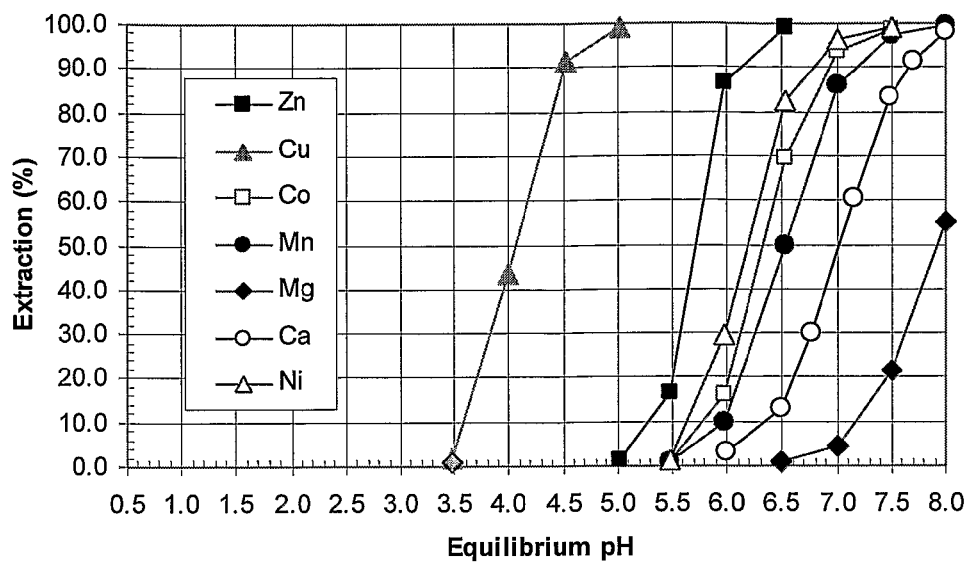
FIGS. 4 and 5 are graphs comparing extraction pH isotherms of metals using a comparative extraction system (FIG. 4) and the extraction system containing Versatic 10 and LIX63 (FIG. 5).
Figure 5:
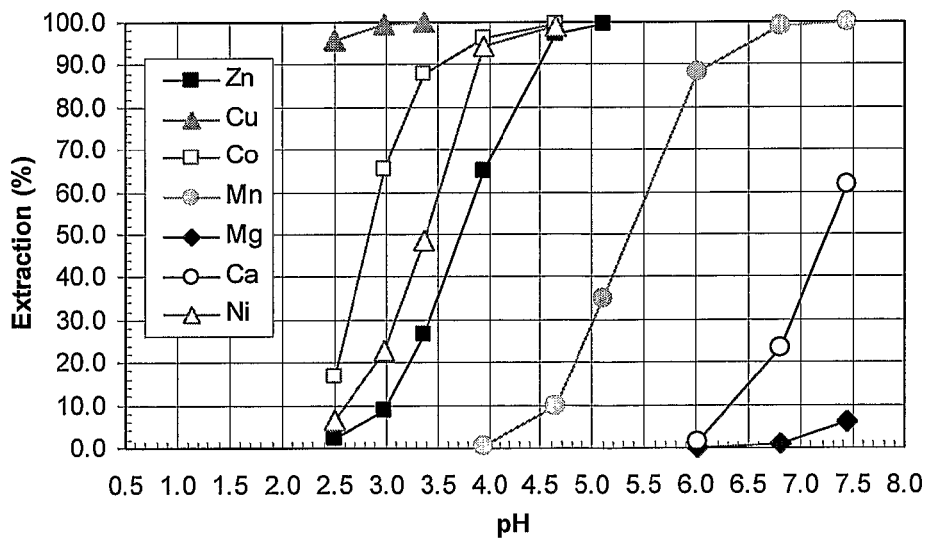

The metal extraction pH isotherms with the 0.5 M Versatic 10 (carboxylic acid) alone were determined and plotted, as shown in FIG. 4. The metal extraction pH isotherms using the combination of 0.5 M Versatic 10 and 0.35 M LIX63 (hydroxyoxime) were also determined and plotted in FIG. 5. Comparison of the two figures reveals that the combination of LIX63 with Versatic 10 resulted in significant synergistic extraction isotherm shifts (to lower pH) for nickel, cobalt, copper, zinc, and manganese and antagonistic shifts (to higher pH) for calcium and magnesium. As shown in FIG. 5, with the 0.5 M Versatic 10/0.35 LIX63 system, the $\Delta pH_{50}$ values of nickel, cobalt, copper, zinc, and manganese were found to be 2.79, 3.50, >2.0, 1.99 and 1.17 pH units, respectively. The $\Delta pH_{50(Mn-Ni)}$ value for the 0.5 M Versatic 10/0.35 M LIX63 system was found to be 1.96 pH units and the $\Delta pH_{50(Mn-Co)}$ value 2.53 pH units, indicating easy separation of nickel and cobalt from manganese, calcium and magnesium.

Example 2

Extraction Kinetics with Versatic 10/LIX63 Synergistic System

This example illustrates that when the synergistic system comprising Versatic 10 and LIX 63 is used, Cu, Co, Zn and Mn display fast extraction kinetics, while the extraction kinetics for Ni are slow. Hence this system, without modification, is suitable for Cu, Co, Zn and Mn recovery but not particularly suited for Ni recovery.

Figure 11:
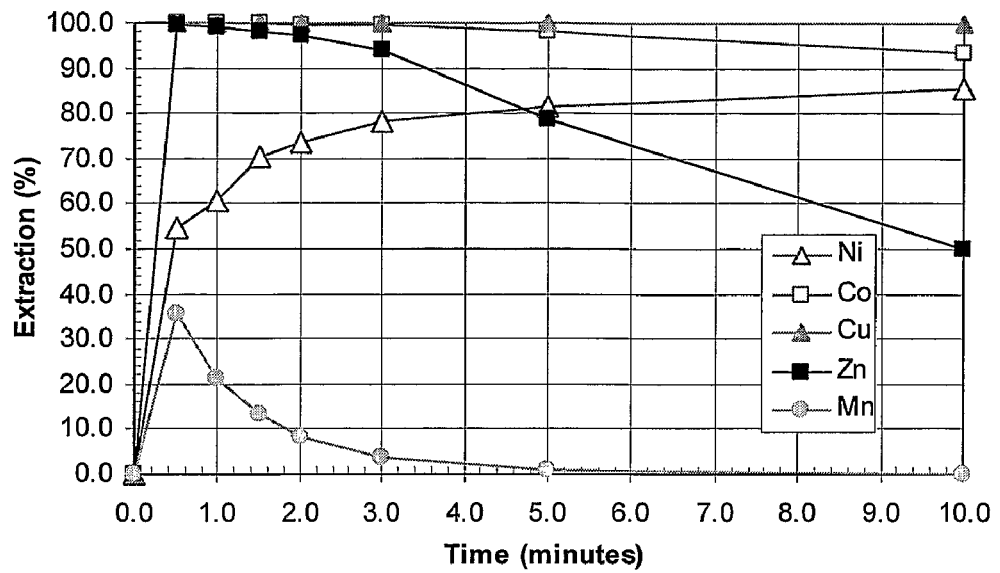
FIG. 11 is a graph showing the extraction kinetics of metals from a leach solution using a comparison extraction system.

Tests were conducted to establish the extraction kinetics of the metals in the synthetic laterite solution using Versatic 10/LIX63. The results are illustrated in FIG. 11. The extraction kinetics of copper, cobalt and zinc and manganese were found to be fast and the extraction kinetics of nickel were found to be relatively slow. Within 30 seconds, only 54.6% Ni was extracted and within 10 minutes 85.5%.

Example 3

Stripping Kinetics with Versatic 10/LIX63 Synergistic System

This example illustrates that when the synergistic system comprising Versatic 10 and LIX 63 is used, Cu, Co, Zn and Mn display fast stripping kinetics, while the stripping kinetics for Ni are slow. Hence this system is potentially suitable for Cu, Co, Zn and Mn recovery when the leach solution contains little Ni.

Figure 12:
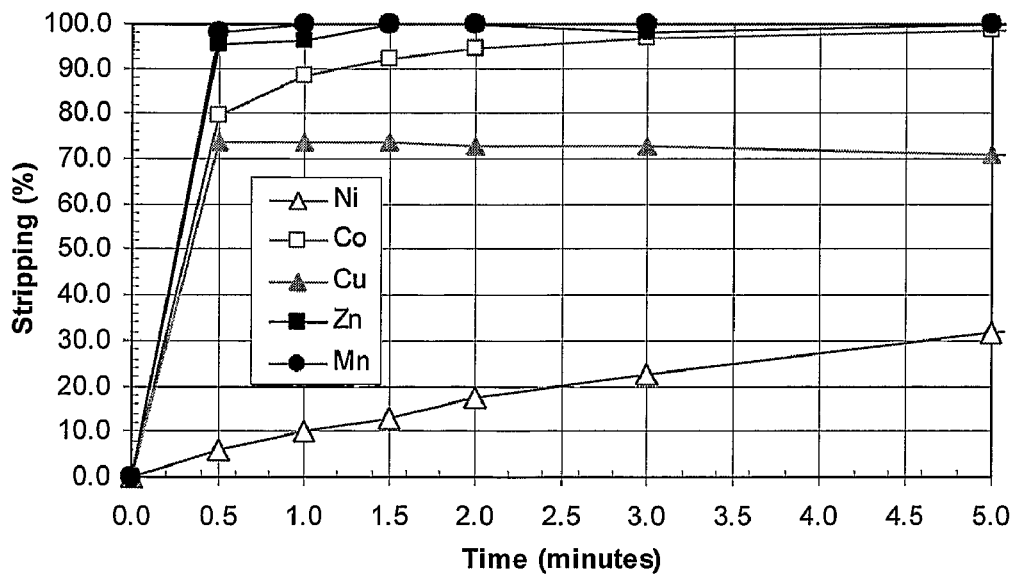
FIG. 12 is a graph showing the stripping kinetics of metals from a loaded organic phase of a comparison extraction system.

Tests were conducted to determine the stripping kinetics of the metals from the 0.5 M Versatic 10/0.35 M LIX63 system. The results are illustrated in FIG. 12. The stripping kinetics of copper, cobalt and zinc were fast. The stripping kinetics of nickel were slow, with 17.7% Ni stripped in 2 minutes and 31.8% in 5 minutes. Improvements in the stripping kinetics are demonstrated below (Example 5) when the kinetic accelerator TBP is used in combination with the carboxylic acid and hydroxyoxime.

Example 4

Stripping of Cobalt from LIX63 Alone and Versatic 10/LIX63 Systems

Cobalt(II) can poison hydroxyoxime reagents such as LIX63. This means that once cobalt(II) is extracted by hydroxyoxime reagents, it cannot be stripped with concentrated acids because it oxidises to cobalt(III). Tests were conducted to see whether the new system results in cobalt poisoning.

Figure 13:
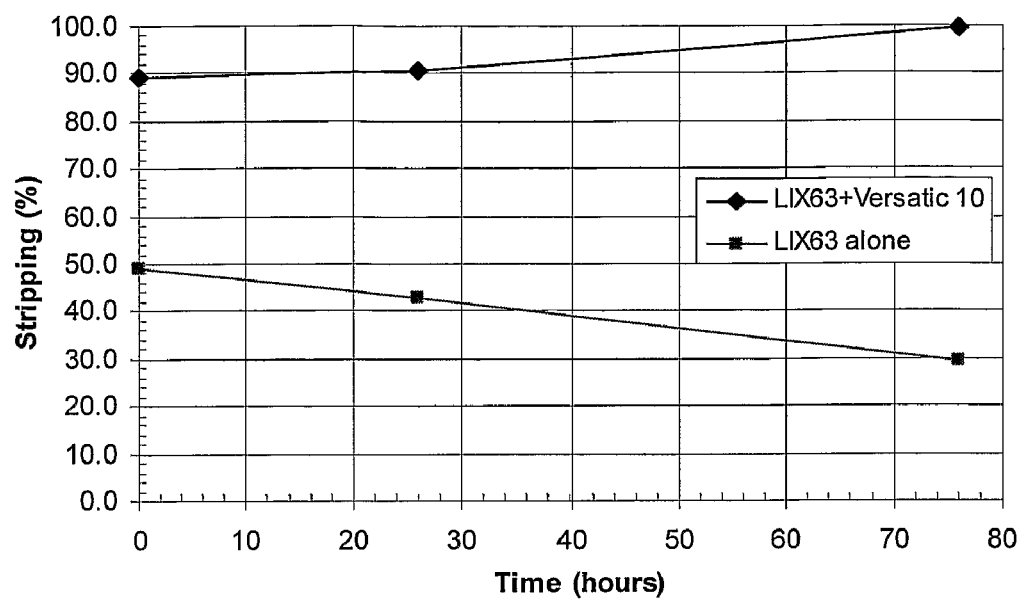
FIG. 13 is a graph comparing the stripping kinetics of cobalt using two different extraction systems to test for cobalt poisoning.

Parallel tests were conducted with 0.35 M LIX63 alone and 0.5 M Versatic 10/0.35 M LIX63 systems by mixing the organic solutions with aqueous solution containing cobalt. The organic and aqueous solutions were left in contact with air bubbling for 76 hours. Thereafter, a sulphuric acid solution of 100 g/l sulphuric acid was used to strip cobalt from the organic solution. The results of the tests are illustrated in FIG. 13. The cobalt stripping efficiency from the 0.35 M LIX63 alone system was only 29.2%. The cobalt stripping efficiency for the 0.5 M Versatic 10/0.35 M LIX63 system was 99.5%. This indicates that cobalt(II) does not poison the Versatic 10/LIX63 system.

Example 5

Stripping Kinetics with Versatic 10/LIX63/Kinetic Accelerator System

This example illustrates that the inclusion of a kinetic accelerator in this extraction system overcomes the slow nickel extraction kinetics.

Figure 6:
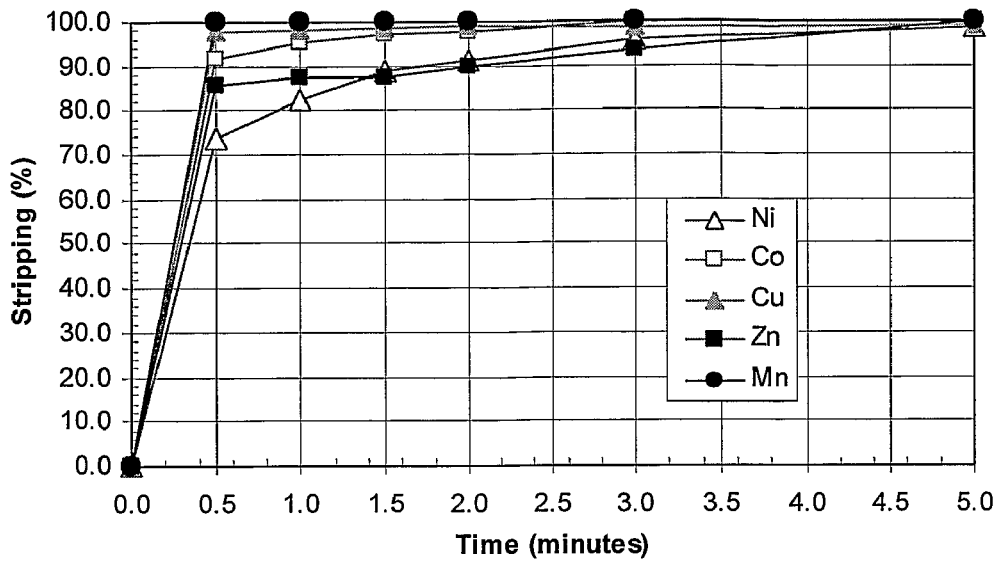
FIG. 6 is a graph showing the stripping kinetics of metals from a loaded organic phase from the extraction system of a second embodiment of the invention.

Example 3 was repeated with the 0.5 M Versatic 10, 0.35 M LIX63 and 0.5M TBP system. The stripping results are illustrated in FIG. 6. In 2 minutes, whereas Example 3 resulted in stripping of only 17.7% of nickel, this increased to 91.3% when the extractant system included a kinetic accelerator TBP. Moreover, as demonstrated in Example 6, the addition of TBP to the Versatic 10/LIX63 system had no adverse effect on the selectivity of nickel and cobalt over manganese. The tests were repeated using isotridecanol as the kinetic accelerator, and similar results were achieved.

Example 6

Extraction pH Isotherms with Versatic 10/LIX63/Kinetic Accelerator System

This example illustrates that the addition of the kinetic accelerator does not adversely impact on the ability of the system to extract nickel and cobalt from manganese.

Figure 7:
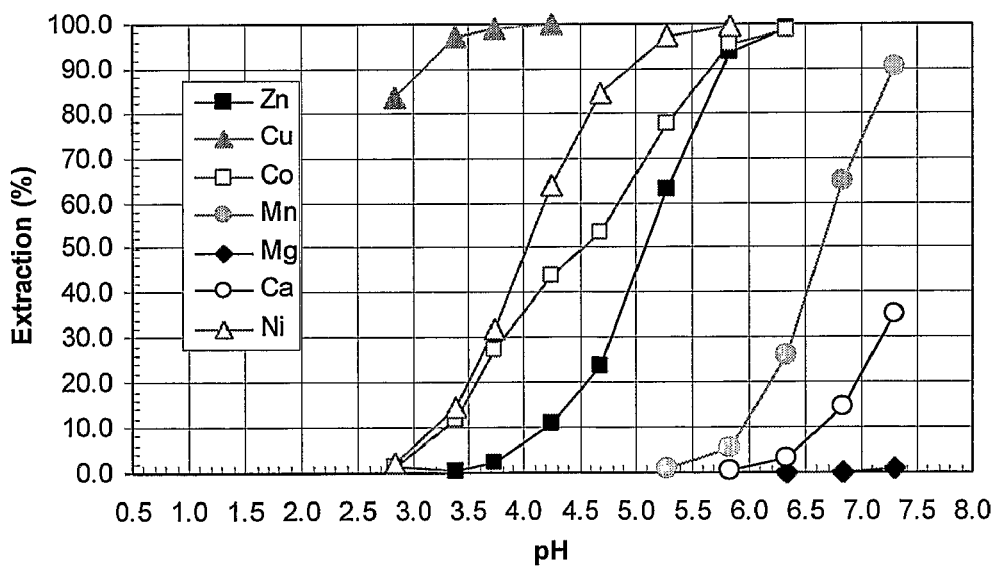
FIG. 7 is a graph showing the Extraction pH isotherms of metals from the organic phase of system of FIG. 6.

The extraction pH isotherms were determined for the Versatic 10/LIX63/TBP system and these are shown in FIG. 7.

The addition of TBP to the Versatic 10/LIX63 system resulted in large antagonistic shifts for Ni, Co, Zn and Mn. The $\Delta pH_{50}$ shifts for Ni, Co, Zn and Mn were −0.63, −1.71, −1.35 and −1.28, respectively. However, the $\Delta pH_{50(Mn-Ni)}$ and $\Delta pH_{50(Mn-Co)}$ values were still greater than 2 pH units. This indicates that the addition of TBP to the Versatic 10/LIX63 system had no adverse effect on the selectivity of nickel and cobalt over manganese. In addition, the cobalt pH isotherm was shifted at the right of nickel, making the selective stripping of cobalt practical.

Example 7

Extraction Kinetics with Versatic 10/LIX63/Kinetic Accelerator System

This example illustrates the fast extraction kinetics of the three-component system.

Figure 8:
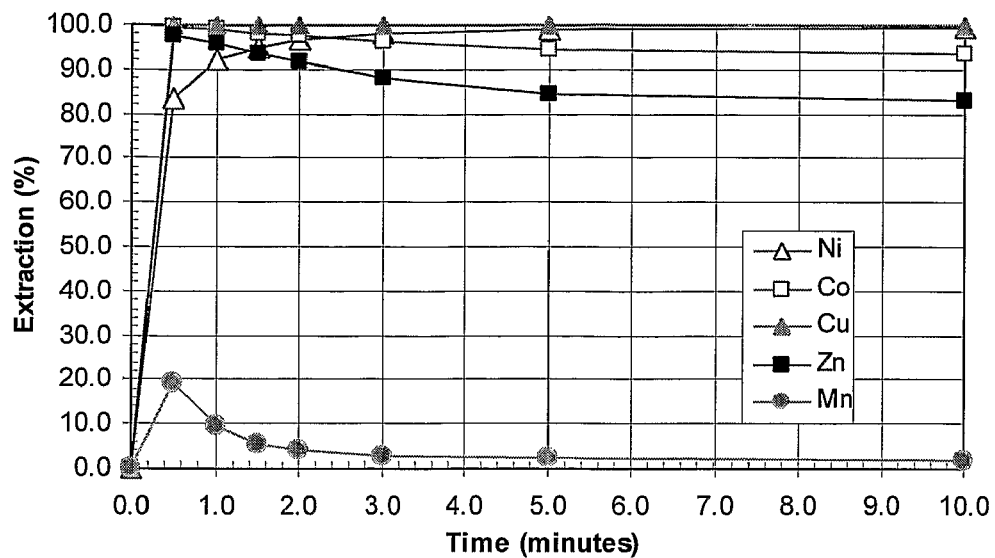
FIG. 8 is a graph showing the extraction kinetics of metals from the organic phase of system of FIG. 6.

The extraction kinetics of the metals in the synthetic laterite leach solution using the 0.5 M Versatic 10/0.35 M LIX63/ 0.5 M TBP system were determined and graphed in FIG. 8. As shown, the extraction kinetics of Ni, Co, Cu, Zn and Mn were fast. Within 2 minutes, the nickel extraction reached 95.2%, which was fast enough for industrial operations.

Example 8

Stripping pH Isotherms

Figure 9:
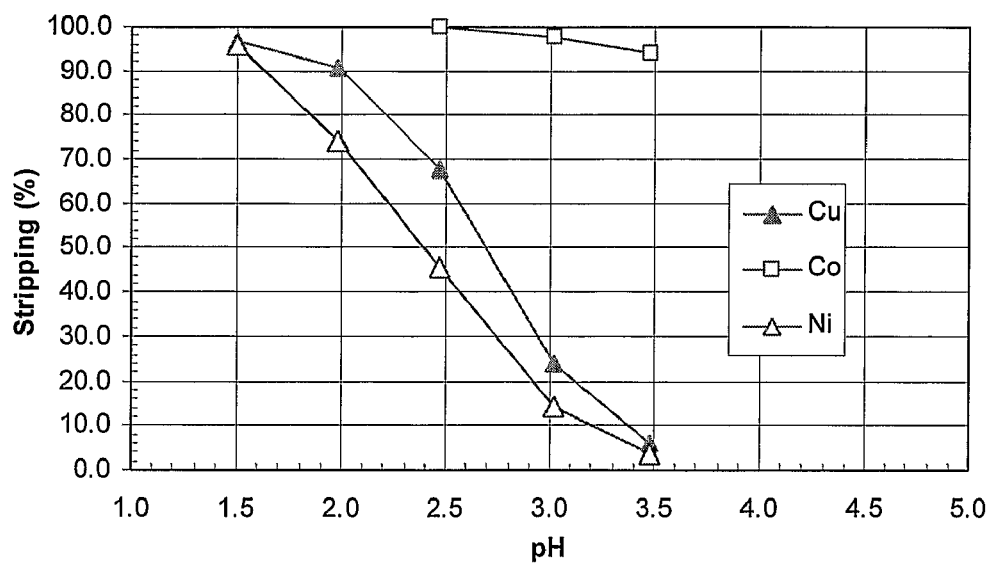
FIG. 9 is a graph showing the stripping pH isotherms of metals from the organic phase of the system of FIG. 6.

Tests were conducted to determine the pH required to strip the metals from the loaded organic systems, and the results are demonstrated in FIG. 9. At pH 3.50, more than 94% Co and only 3.6% Ni could be stripped, indicating that cobalt can be separated from nickel by selective stripping. Therefore, it was determined that only one SX circuit is required to separate nickel and cobalt from Mn, Ca and Mg and also to separate nickel and cobalt from each other.

Process Flowcharts

Example 9

Process for Separation and Recovery of Cobalt and Nickel from Leach Solution

Figure 2:
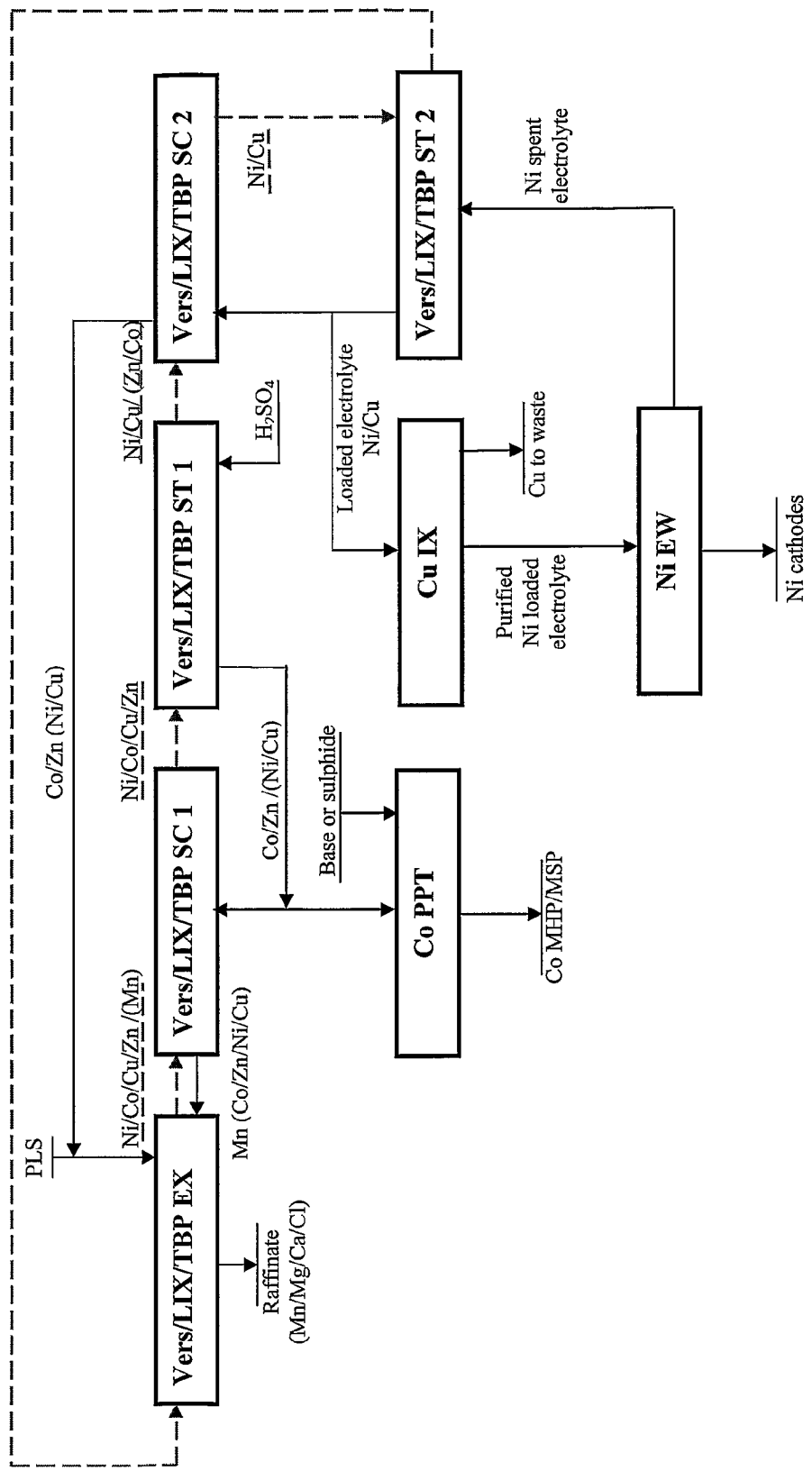
FIG. 2 is a more detailed schematic flow chart of a part of the process illustrated in FIG. 1.

Based on the above findings, a new DSX process flowsheet was formulated. The flowsheet is shown in FIGS. 1 and 2. By using the Versatic 10/LIX63 synergistic system, a kinetic accelerator, TBP, a stabilizer, Ionol and a selective stripping strategy, three goals are achieved in one SX circuit: the separation of nickel and cobalt from manganese, magnesium, calcium and chloride, the separation of cobalt from nickel and the concentration of cobalt and nickel.

PAL

As shown in FIG. 1, a nickel and cobalt containing ore, such as a laterite ore, is subjected to pressure acid leaching in accordance with standard procedures known in the art.

Neutralisation

The leach solution is subjected to neutralisation with limestone at pH 4.5-5.0 to precipitate impurity elements Fe(III), Al, Si and Cr.

Synergistic Solvent Extraction (EX)

The synergistic solvent extraction and following stages are represented briefly in FIG. 1, and are expanded upon in FIG. 2. The pregnant leach solution (PLS) from the neutralisation or iron precipitation step is subjected to the synergistic solvent extraction (SX) step. In this step an organic solution of a carboxylic acid (Versatic 10 acid) and a hydroxyoxime (5,8-diethyl-7-hydroxy-6-dodecanone oxime—(LIX63)), a stabilizer (2,6-bis(1,1-dimethylethyl)-4-methyl phenol, Ionol) and a kinetic accelerator, tributyl phosphate (TBP), in organic diluent Shellsol 2046 is contacted with the PLS to obtain (a) an aqueous raffinate containing almost all the manganese, magnesium, calcium and chloride and (b) a loaded organic solution containing almost all the nickel, cobalt, copper, zinc and a very small amount of manganese.

Scrubbing (SC1)

The organic solution from the extraction step is subjected to scrubbing 1 using a cobalt and zinc sulphate solution containing a small amount of nickel and copper from the next step, stripping 1, resulting in (a) a scrubbed organic solution containing nickel, copper, cobalt and zinc and (b) a loaded scrub liquor containing mainly manganese, and small amounts of cobalt, zinc nickel and copper, which is recycled to the extraction step.

Selective Stripping (ST1)

The scrubbed organic solution is subjected to stripping 1 (selective strip) using a sulphuric acid solution, resulting in (a) a loaded strip liquor containing cobalt and zinc and a small amount of nickel and copper and (b) a stripped organic solution containing mainly nickel and copper and a very small amount of cobalt and zinc.

Scrubbing (SC2)

The organic solution from stripping 1 is subjected to scrubbing 2 using a nickel and copper sulphate solution from the next step, stripping 2, resulting in (a) a scrubbed organic solution containing nickel and copper and (b) a loaded scrub liquor containing cobalt, zinc and some nickel and copper which is recycled to the extraction step.

Stripping (ST2)

The scrubbed organic solution is subjected to stripping 2 using a nickel spent electrolyte from the nickel electrowinning step containing sulphuric acid and a relatively low concentration of nickel, resulting in (a) a loaded strip liquor containing a high concentration of nickel and a small amount of copper and (b) a stripped organic solution containing a very small amount of nickel and copper, which is recycled to the extraction step. Ion Exchange (IX) and Electrowinning (EW)

The loaded strip liquor from stripping 2 is subjected to an ion exchange step to remove copper and the eluate from the ion exchange step is subjected to nickel electrowinning, resulting in a high-grade nickel metal product. The copper ion exchange and nickel electrowinning are known processes and commercially used in the minerals industry.

Cobalt Precipitation (PPT)

The loaded strip liquor from stripping 1 is subjected to cobalt precipitation using base or sulphide, resulting in sellable products mixed hydroxide product (MHP) or mixed sulphide product (MSH). The cobalt precipitation is a known process and commercially used in the minerals industry.

Example 10

Variation on Process of Example 9

Figure 3:
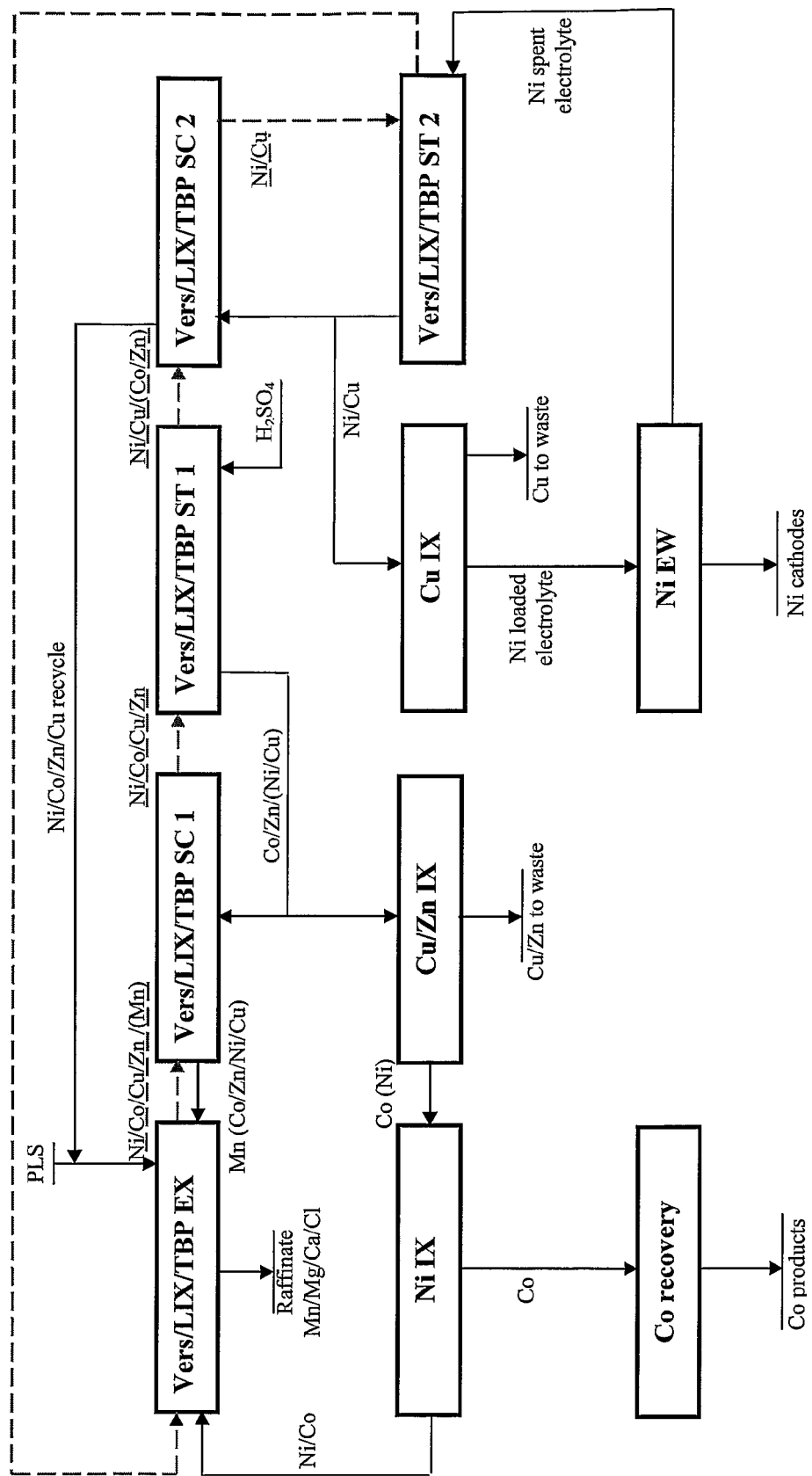
FIG. 3 is a schematic flow chart of a second embodiment of the invention, which is a variation on the process illustrated in FIG. 2.

Pure cobalt products can be obtained from the loaded liquor from strip 1 using ion exchange to remove copper, zinc and nickel. The details of the steps are shown in FIG. 3.

The loaded strip liquor from stripping 1 (selective strip) in the SX circuit is subjected to an ion exchange step, resulting in (a) an eluate liquor containing cobalt and a small amount of nickel, and (b) a waste solution containing copper and zinc for disposal. This is a known process and commercially used in the minerals industry. The raffinate liquor is subjected to another ion exchange step, resulting in (a) a desorption solution containing nickel and a small amount of cobalt, which is recycled to the extraction step, and (b) a pure cobalt solution which is subjected to a cobalt recovery step, where cobalt cathodes can be obtained by electrowinning or a variety of cobalt chemical products by precipitation as required. These are known processes and commercially used in the minerals industry.

Example 11

Second Variation on the Process of Example 9

Figure 10:
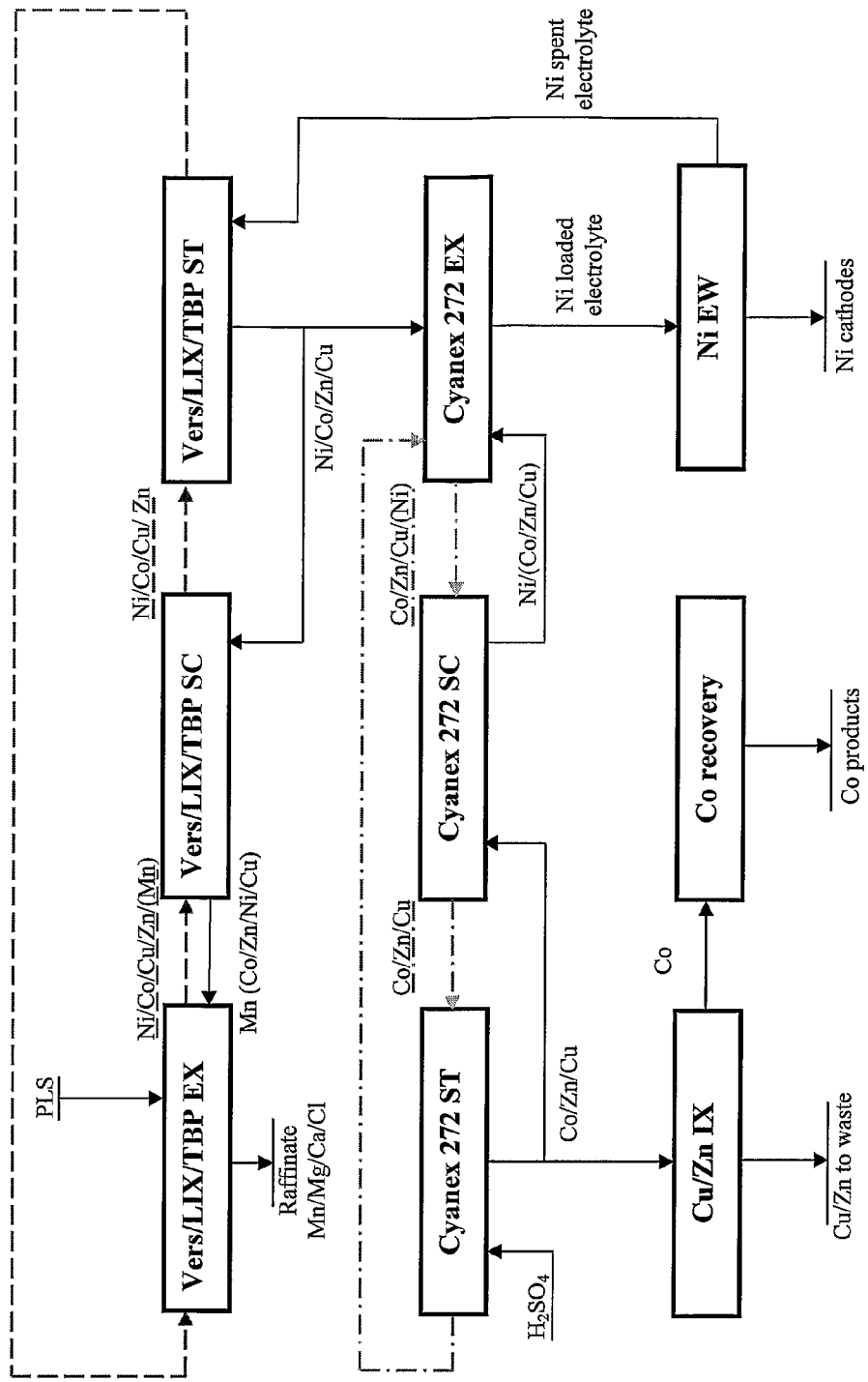
FIG. 10 is a detailed schematic flow chart of a third embodiment of the invention.

According to this variation, a second solvent extraction circuit is used to separate nickel and cobalt with Cyanex 272 in a diluent such as Shellsol 2046. This process is represented in a flowchart in FIG. 10.

After scrubbing (SC1 from FIG. 2), the scrubbed organic is subjected to a stripping step using the spent electrolyte from nickel electrowinning step to obtain (a) a loaded strip liquor containing nickel, cobalt, copper and zinc and (b) a stripped organic solution which is recycled to the extraction step.

The loaded strip liquor is subjected to an extraction step using Cyanex 272 to obtain (a) a raffinate solution containing only nickel and (b) a loaded organic solution containing cobalt, zinc, copper and a small amount of nickel.

The loaded Cyanex 272 organic solution is subjected to scrubbing with a scrub solution from the next stripping step, resulting in (a) a loaded scrub liquor containing nickel and some cobalt, zinc and copper which is recycled to the extraction step, and (b) a scrubbed organic solution containing cobalt, copper and zinc.

The scrubbed Cyanex 272 organic solution is subjected to a stripping step with sulphuric acid, resulting in a loaded strip liquor containing cobalt, zinc and copper, and a stripped organic solution which is recycled for extraction.

The loaded strip liquor is subjected to an ion exchange step to remove copper and zinc, resulting in (a) an eluate solution containing only cobalt and a waste solution containing copper and zinc for disposal.

The pure cobalt sulphate solution could be subjected to (a) electrowinning to obtain cobalt cathodes, or (b) precipitation with a base to obtain cobalt hydroxide, or with hydrogen sulphide to obtain cobalt sulphide, or with a carbonate solution to obtain cobalt carbonate.

Example 12

Effect of Stabilizer (Ionol) on Degradation of Hydroxyoxime (LIX63) in Verstaic 10/LIX63 System This example shows how addition of an anti-oxidant stabilizer (Ionol) slows the rate of degradation of the hydroxyoxime LIX63 in the Versatic 10/LIX63 extraction system.

An organic extractant solution (25 mL) containing 0.4M LIX63 and 0.5M Versatic 10 in Shellsol D70 diluant was loaded with a synthetic leach solution (50 mL) containing 0.5 g/L Ca, 9 g/L Na, 24 g/l Mg, 45 g/L Mn, 0.2 g/L Co, 1 g/L Zn and 0.15 g/L Cu, at pH 4.5 and left to stand in a water bath at 25° C. Two further (duplicate) systems, each containing 10 g/L Ionol were prepared and treated similarly. After 18 days, the organic solution was sampled and analysed for LIX63 using gas chromatography. The results are shown in the table below. After 18 days in the Ionol-free system, 5.2% of the LIX63 had been degraded. After 18 days in the duplicate systems initially containing 10 g/L Ionol, 0.7% and 1.6% of the LIX63 had been degraded.

TABLE 1

Oxime concentration in the loaded organic solutions as a function of contact time.

| | LIX63 (%) relative to initial concentration | | |
| --- | --- | --- | --- |
| Contact time (days) | Versatic 10 + LIX63 | Versatic 10 + LIX63 + Ionol | Versatic 10 + LIX63 + Ionol |
| 0 | 100.0 | 100.0 | 100.0 |
| 8 | 97.0 | 99.6 | 99.2 |
| 18 | 94.8 | 99.3 | 98.4 |

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A process for the separation of nickel, cobalt or both from impurity elements selected from one or more of calcium, magnesium, manganese and chloride contained in a leach solution, the process comprising the step of contacting the leach solution with a solvent extraction solution comprising a carboxylic acid, a chelating aliphatic hydroxyoxime and a kinetic accelerator, wherein the solvent extraction step effects extraction of nickel, cobalt, or both into an organic phase, to the extent that these elements are present, with calcium, magnesium, manganese, and chloride being rejected to an aqueous phase.

2. The process of claim 1, wherein the solvent extraction step comprises contacting the leach solution with an organic solution comprising the carboxylic acid, the aliphatic hydroxyoxime and the kinetic accelerator.

3. The process of claim 2, wherein cobalt poisoning as a result of oxidation of cobalt(II) to cobalt(III) is avoided.

4. The process of claim 2, wherein all of the organic phase separated from the solvent extraction step is subjected to stripping with an acid solution to strip metals present from the organic phase.

5. The process of claim 4, wherein the stripping step is preceded by a scrubbing step.

6. The process of claim 4, wherein the stripping step is a selective stripping step.

7. The process of claim 2, wherein the organic solution displays fast extraction kinetics for nickel, cobalt, copper, zinc and manganese.

8. The process of claim 2, wherein the organic solution is in contact with the leach solution for a period of 5 minutes or less.

9. The process of claim 8 wherein the organic solution is in contact with the leach solution for a period of 3 minutes or less.

10. The process of claim 8, wherein the organic solution is in contact with the leach solution for a period of 2 minutes or less.

11. The process of claim 2, wherein the organic solution comprises a stabilizer against hydroxyoxime degradation.

12. The process of claim 11, wherein the stabilizer reduces oxidation and/or hydrolysis of the hydroxyoxime.

13. The process of claim 12, wherein the stabilizer is an anti-oxidant.

14. The process of claim 1, wherein the solvent extraction step effects extraction of a large proportion of the nickel, cobalt, copper and zinc into an organic phase, to the extent that these elements are present, with a large proportion of the calcium, magnesium, manganese and chloride being rejected to the aqueous phase.

15. The process of claim 1, wherein the leach solution contains impurity elements selected from one or more of calcium, magnesium, manganese and chloride, optionally together with copper and/or zinc.

16. The process of claim 1, wherein the leach solution is a solution that has been subjected to a preliminary iron and/or aluminium precipitation step to precipitate out iron and/or aluminium to leave an aqueous leach solution containing the nickel, cobalt or both impurity elements other than iron and aluminium.

17. The process of claim 1, wherein the carboxylic acid is 2-methyl, 2-ethyl heptanoic acid or a cationic exchange extractant having extraction characteristics similar to 2-methyl, 2-ethyl heptanoic acid.

18. The process of claim 1, wherein the hydroxyoxime is a chelating α-hydroxyoxime.

19. The process of claim 1, wherein the kinetic accelerator increases the rate of extraction and/or stripping kinetics of nickel.

20. The process of claim 1, wherein the pH of the aqueous phase in the solvent extraction step is maintained in the range of from 5.0 to 6.5 to effect extraction of the cobalt and/or nickel into the organic phase.

21. The process of claim 20, wherein the pH of the aqueous phase in the solvent extraction step is maintained in the range of from 5.5 to 6.0.

22. The process of claim 21, wherein the organic phase from the solvent extraction step is subjected to scrubbing.

23. The process of claim 1, wherein cobalt and nickel are extracted into the organic phase, and the organic phase is subjected to selective stripping to separate to a significant extent the cobalt from the nickel.

24. The process of claim 23, wherein the selective stripping comprises contacting the organic phase from the solvent extraction with an acidic aqueous solution to yield (a) a loaded strip liquor containing cobalt, and (b) a selectively stripped organic solution containing nickel.

25. The process of claim 24, wherein the acidic aqueous solution used in the selective stripping has a pH in the range of 3.0 to 4.0.

26. The process of claim 24, wherein the cobalt is recovered from the loaded strip liquor.

27. The process of claim 26, wherein the cobalt is recovered by cobalt precipitation.

28. The process of claim 23, wherein the nickel is recovered from the stripped organic solution from the selective stripping step.

29. The process of claim 28, wherein the organic solution from the selective stripping step contains nickel and copper, and is subjected to stripping with an aqueous acid solution to separate the nickel into the aqueous phase with only a small amount of the copper, followed by ion exchange to remove the copper, and the nickel is recovered from an eluate of the ion exchange.

30. The process of claim 22, wherein the scrubbed organic solution is stripped to obtain (a) a loaded strip liquor containing nickel and cobalt, and copper and zinc to the extent that copper and zinc are present, and (b) a stripped organic solution.

31. The process of claim 30, wherein the loaded strip liquor is subjected to organophosphinic acid solvent extraction.

32. The process of claim 31, wherein the organophosphinic acid solvent extraction produces (a) a loaded organic solution which contains cobalt and (b) an aqueous raffinate containing nickel.

33. The process of claim 32, wherein the loaded organic solution from the organophosphinic acid extraction is scrubbed, the scrubbed organic solution containing cobalt is subjected to stripping with sulphuric acid at an appropriate pH, the loaded strip liquor containing cobalt is subjected to ion exchange to remove copper and zinc present, and cobalt recovered from the eluate.

34. The process of claim 33, wherein nickel is recovered from the aqueous raffinate from the organophosphinic acid extraction.

35. The process of claim 1, wherein scrubbing is conducted on the organic phase after each solvent extraction.

* * * * *

UNITED STATES PATENT AND TRADEMARK OFFICE
CERTIFICATE OF CORRECTION

| | | |
|---|---|---|
| PATENT NO. | : 7,935,322 B2 | |
| APPLICATION NO. | : 10/588116 | |
| DATED | : May 3, 2011 | |
| INVENTOR(S) | : Cheng et al. | |

It is certified that error appears in the above-identified patent and that said Letters Patent is hereby corrected as shown below:

Title page, (73) Assignee: "Indistrial" should read --Industrial--

Signed and Sealed this
Fourteenth Day of February, 2012

David J. Kappos
*Director of the United States Patent and Trademark Office*